Aug. 8, 1967
H. B. KAST
3,334,521
CONTROL MECHANISM
Original Filed Oct. 1, 1965
2 Sheets-Sheet 1
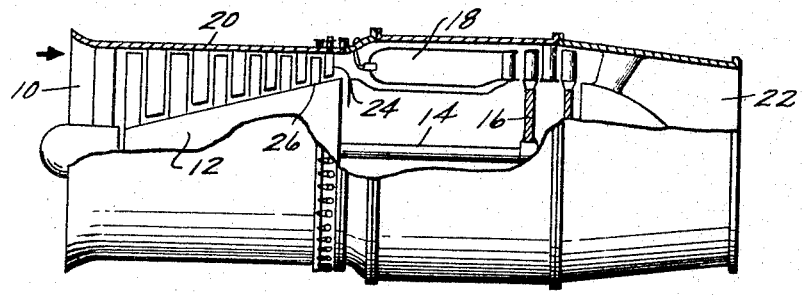
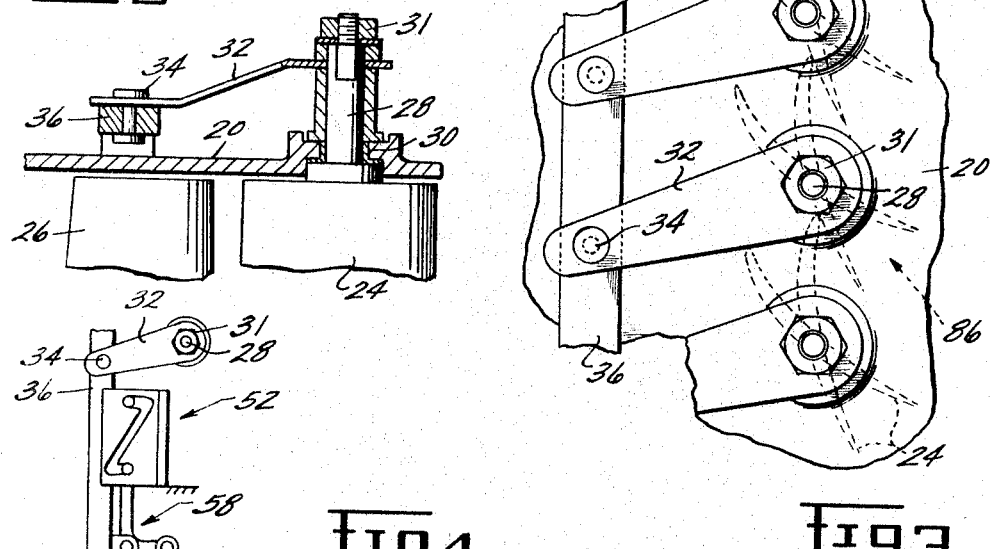
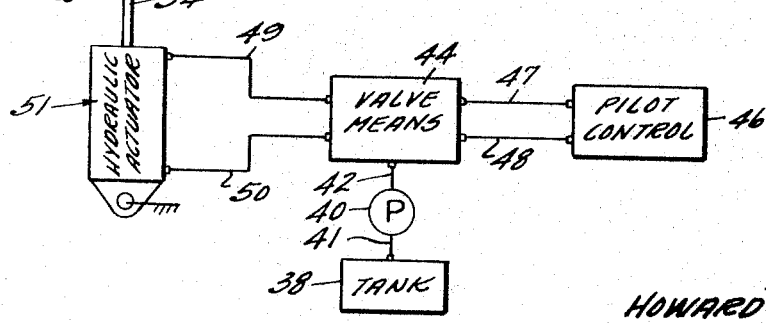
INVENTOR.
HOWARD B. KAST
BY
Harry C. Burgess
ATTORNEY Aug. 8, 1967   H. B. KAST   3,334,521
CONTROL MECHANISM
Original Filed Oct. 1, 1965   2 Sheets-Sheet 2
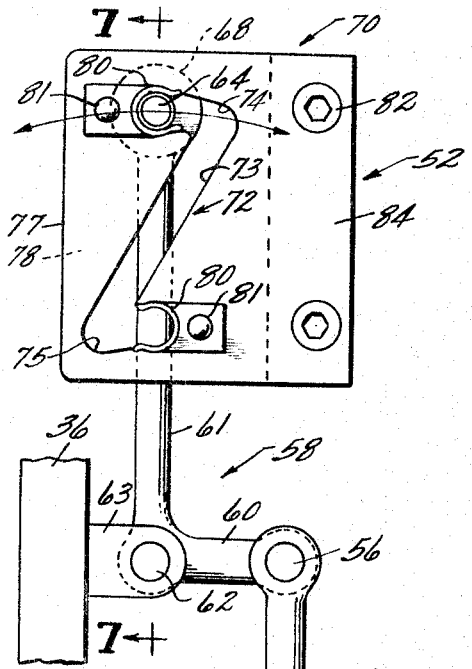
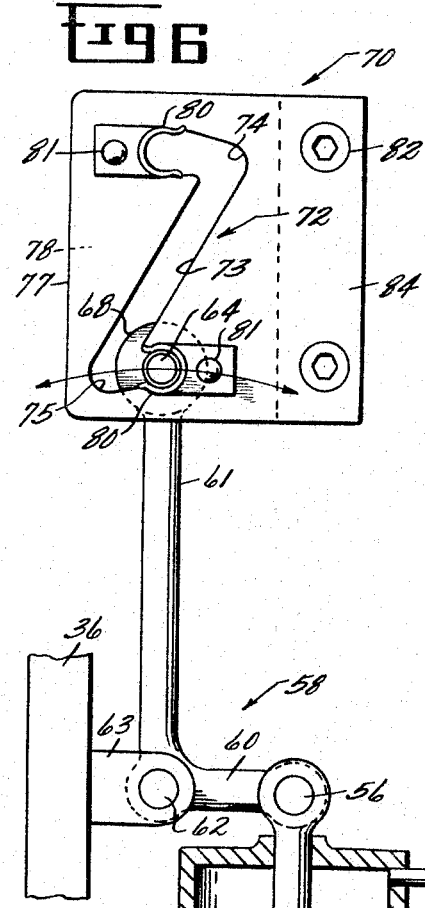
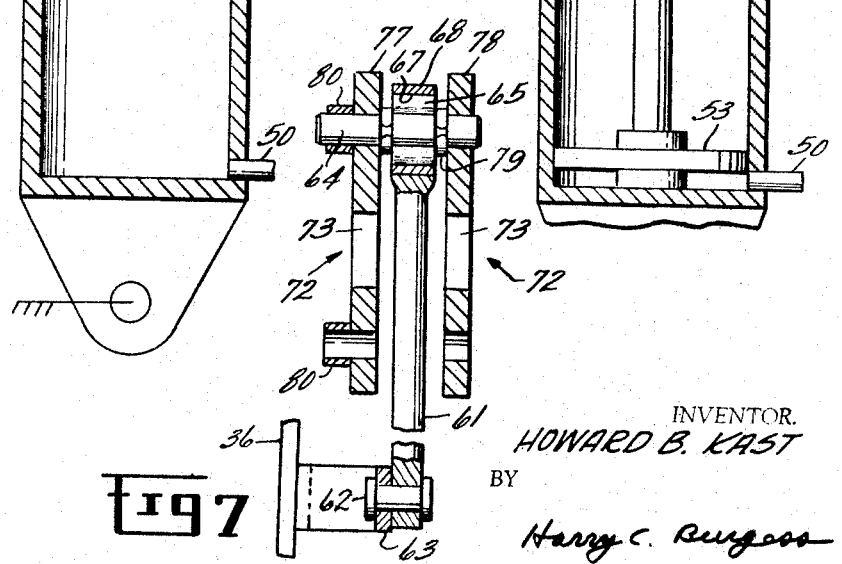
INVENTOR.
HOWARD B. KAST
BY
Harry C. Burgess
ATTORNEY

3,334,521
CONTROL MECHANISM
Howard B. Kast, Fairfield, Ohio, assignor to General Electric Company, a corporation of New York
Continuation of application Ser. No. 495,763, Oct. 1, 1965. This application May 27, 1966, Ser. No. 553,578
5 Claims. (Cl. 74—110)

This invention relates to a control mechanism and, more specifically, to a control mechanism which allows an actuator to move a load from one of a plurality of pre-selected stop positions to another such stop position, yet prevents the load forces acting upon the mechanism from themselves actuating the mechanism away from any pre-selected stop position. This application is a continuation-in-part of application Ser. No. 248,534, filed Dec. 31, 1962, now abandoned.

In the design of aircraft and, in particular, aircraft engine accessory and control systems, one of the most pressing problems facing the designer is how to ensure that the system components will perform in the manner and at the time required. A facet of this problem concerns the need for built-in safeguards to make certain a given system or accessory will be energized when—and only when—the operator desires it to perform the assigned task. One particular area where these safeguards are very important is in the design of systems for multi-engine jet aircraft.

Until very recently operation of single and multi-engine jet aircraft, with the possible exception of a few experimental military vehicles, has largely been confined to flight speeds of Mach 2.0 (about 1200 m.p.h.) and under. More advanced high-Mach military aircraft and supersonic commercial jet transports scheduled for use in the near future will, however, operate at considerably higher speeds. It has therefore become necessary to place added stress on reliability of the aircraft engines, accessories and related control systems. The related problems of reliability and safety will perhaps be more acute in the case of future high-Mach aircraft utilizing advanced high performance turbojet type engines. For reasons of passenger and crew member safety and mission accomplishment, it will therefore be essential that such an aircraft be able to continue to perform its flight mission with one—or perhaps more—of its engines non-operative.

It is, of course, obvious that a certain point can be reached in any multi-engine installation when enough of the powerplants would become non-operative to prevent the continuation of flight. Assuming, however, that flight is still possible, one of the primary problems in these multi-engine high speed aircraft utilizing turbojet or turbofan engines, i.e., any engine which has rotating components such as compressor or power turbine bladed rotors mounted on a shaft, concerns the high rotative speed of the shaft caused by the force of the air entering the engine inlet. To explain, if a gas turbine engine becomes non-operative at a high Mach number, for example, because of failure of any of the many accessory, fuel system, or lubrication system components, the supersonic velocity of the air produces an extremely high total pressure at the inlet of the engine, which will be combined with a low total pressure at the exit. When the high rotative speed of the non-operating engine, involving extremely large moments of rotating inertia, is coupled with a dearth of engine lubrication system heat sink (since there would no longer be fuel flowing to the non-operating engine and the heat sink or cooling medium for the lubrication fluid normally furnished by the fuel in such aircraft would not be available), inevitably the result is seizure of the rotor shaft bearings. An abrupt seizure could produce an undesirable and even dangerous condition in the aircraft or vehicle by reason of the engine mounting structure or engine nacelle suffering severe structural damage during the sudden and violent deceleration of the rotating components. In the case of a supersonic commercial transport, or even a military bomber, it will be vital that the aircraft continue to maintain altitude and speed using the remaining operating engines. That the problem is particularly acute in aircraft designed to fly at Mach 2.5 and above will be realized when it is understood that if the fuel supply is cut off, for example, a turbojet engine can windmill at up to 93% of full speed. The situation is further complicated by the fact that in the design of aircraft capable of these high speeds, the problem of weight is critical. Thus, it has been found that proposals for use of inlet duct closure means, such as flaps, or compressor variable inlet guide vanes have had to be abandoned as impractical since these structures, of necessity, must be relatively massive and heavy to withstand the extreme air blast. Another suggested solution involving reverse turbine rotor blade air impingement during windmilling to brake the rotor shaft has also proved to be less than desirable due to the inefficiency occasioned by the unfavorable curvature of the typical turbine blade airfoil. It will therefore be clear that in any means or system adopted to control turbojet engine windmilling, reliability and safety of operation are important factors.

There are, in addition, numerous other commercial and industrial machines wherein reliability and safety of operation will be prime design criteria. Specifically, where actuation means are necessary to move a control mechanism between pre-selected operating positions, or from an operating to a non-operating position—and vice versa—it will be highly desirable to provide means to ensure that forces imposed on the mechanism through the load (aerodynamic forces, for example, in a turbojet engine application) do not themselves actuate the mechanism.

Accordingly, a general object of the present invention is to provide an improved control mechanism having a positive latching means for use in an operating environment requiring a high degree of safe operation.

A more specific object of the present invention is to provide a safe, reliable, positive latching means in a control mechanism adapted to move a member between pre-selected operating positions, or from an operating to a non-operating position—and vice versa—wherein it will be assured that forces acting on the mechanism by reason of loads imposed on the member which the mechanism operates do not in and of themselves result in operation of the mechanism.

Briefly stated, one embodiment of my invention comprises in a control system for use in a high reliability/safety environment such as, for example, a high-speed aircraft having a multiplicity of turbojet type engines each including a compressor having a row of adjustable stator vanes adjacent the compressor outlet, a plurality of lever arms affixed to the row of stator vanes, a power source, and motor means energized by the power source, a control mechanism connecting the motor means with the stator vanes through the plurality of lever arms. The control mechanism includes a bellcrank and a member adapted to be driven along a path between two extreme positions, the member moving relative to the row of stator vanes when so driven and carrying with it the bellcrank pivotally mounted on the driven member at the juncture of the bellcrank arms. Latching means freely mounted at the end of one of the arms of the bellcrank extends transversely thereof so as to engage an elongated slot in a support member fixedly located with respect to the driven member. The slot is angled with respect to said path and the latching means is guided therealong in order that as the driven member moves along said path towards either of the said extreme positions—said path by the motor means being connected to the other arm of the bellcrank—the latching means is caused to engage a short arcuate slot at either end of the angled slot when the driven member reaches a respective one of either of said positions. The latching means is stopped in either arcuate slot and retained therein against the impoistion of external forces imposed on the driven member, e.g., through the vanes, but is immediately releasable if—and only if—the motor means is actuated to move the driven members along the path towards the other of the two extreme positions. This feature is provided by reason of a particular relationship of the circular axes of the arcuate slots and the bellcrank pivot axis. That is, a first one of the slots has its circular axis co-linear with the axis of the bellcrank pivot when the driven member is in one of said extreme positions and, conversely, the other slot has its axis co-linear with the bellcrank pivot axis when the driven member has moved along said path to the other of said extreme positions.

Other applications, objects, and advantages of the invention will become more apparent and the invention better understood when the following detailed description of the described embodiment is read in conjunction with the drawings thereof wherein:

FIG. 1 is a side view of a typical turbojet aircraft engine, partially cut away to show the arrangement of the components thereof, the engine having a row of adjustable stator vanes;

FIGS. 2 and 3 are enlarged fragmentary views partially in cross-section, of a portion of the means used to rotate a stator vane about its axis, and indicating vane position in both a normal operating (open) position and a nonoperative (closed) position;

FIG. 4 is a schematic drawing showing the components of the described control system including positive latching means for locking the actuating means in the pre-selected stop positions;

FIG. 5 is an enlarged view of the latching means of the system in one (e.g., open) position; and FIG. 6 is an enlarged view of the latching means of FIG. 5 in another (e.g., closed) position; and FIG. 7 is a view along line 7—7 of FIG. 5.

While the subsequent detailed description of the control mechanism shows the use of such in a windmill brake control system for a conventional single shaft turbojet engine in a multi-engine installation, it will be understood that other apparatus in addition to gas turbine engines having one or more compressor and turbine rotors mounted on a main shaft may equally benefit from the teachings of the invention such as, for example, a motor or engine control or accessory system wheerin positive control of movement of movable mechanism components is desired. Thus, the device is not limited to the aircraft field but is applicable wherever actuators, including hydraulic, pneumatic or screwjack types, are used.

Turning now specifically to FIGURE 1, shown is a typical turbojet engine having an inlet end, indicated generally at 10. The engine includes a compressor rotor 12 mounted on a central shaft 14. The shaft 14 also supports a turbine rotor 16 furnishing the driving force for the compressor rotor. The turbine rotor may be single or double staged (dual rotors), as shown. Intermediate the compressor and turbine rotors are means for providing combustion in the engine, such as a plurality of liners or cans, one of which is indicated at 18. The engine components are surrounded in the usual manner by an outer casing 20 providing a duct through which air flows in the direction of the large arrow in FIGURE 1. After combustion takes place, the hot gas stream exits through an engine exhaust nozzle, indicated generally at 22. One portion of the actuating mechanism for the engine depicted, which will be one of a number of like engines and partial systems in a multi-engine installation, comprises the row of variable stator vanes 24 located at the rear of the compressor. The stator vanes, as is normal, are positioned adjacent a row of compressor rotor blades, indicated at 26. As shown in the enlarged view of FIGURES 2 and 3, each variable stator vane 24 includes a trunnion 28 projecting outwardly through an opening 30 in the casing 20. Secured to the threaded outer end of the trunnion by a nut 31 is a lever arm 32, the other end of which is connected by suitable means, such as pin 34, to a circumferentially-extending actuator ring 36. The ring is adapted to be moved in a rotary direction with respect to the engine and preferably comprises a pair of so-called "half-rings" suitably joined. For a more complete description of the variable stator engine system, reference may be made to the following patents of common assignment: Neumann No. 2,933,234; Eckenfels et al. No. 2,842,305; or Warren No. 2,999,630.

The primary elements of the control system power supply used in the described jet engine windmill brake arrangement are schematically depicted in FIGURE 4. The system is hydraulic in the case and includes a supply of hydraulic fluid contained in a tank 38 suitably affixed to the engine casing, a pump 40 which projects fluid from the tank through conduits or connecting lines 41 and 42 intermediate the pump tank, and a valve means 44. The valve means 44 is preferably electrically controlled by a pilot control 46 situated in the aircraft cockpit and operably connected by lines 47 and 48 to the valve means. In response to a signal from the pilot the valve operates in a known manner to supply fluid through conduits 49 and 50 to actuator or motor means, indicated generally at 51.

Turning now to FIGURES 5–7, illustrated in detail is the control mechanism and latching means, indicated generally at 52, of the subject invention, which in the disclosed control system provides movement of the stator vanes against the aerodynamic loads between the normal operating (stator vanes open) and the emergency non-operating (stator vanes closed) positions, shown in FIGURE 3, the latter being used for windmill braking. In the disclosed embodiment, the hydraulic actuator 51 includes an internal piston 53 drivingly connected to one end of a piston rod 54 movable back and forth (up and down in the drawing) in response to increasing or decreasing fluid pressure in lines 49–50 leading to opposite sides of the piston. The other end of the rod 54 is pivotally connected at 56 to one arm of a bellcrank, indicated generally at 58. The arm 60 to which the rod is connected is the shorter arm of the bellcrank with the other arm 61 being considerably longer and being arranged to extend generally in the same direction as the piston rod 54. Thus, the arms extend at right angles to each other. The bellcrank itself is pivotally supported at 62—at the junction of arms 60 and 61—by a clevis 63 affixed to the vane actuator ring 36. The free end of arm 61 supports a pin member 64 disposed in a bearing 65. The bearing is located in a hole 67 in a boss 68 at the extremity of the arm. As shown perhaps more clearly in FIGURE 7, the pin 64 projects considerably on both sides of the boss with its axis being generally perpendicular to that of the arm 61, as is the axis of the bellcrank pivot pin 62. Means for guiding and directing movement of the latching pin 64 and, hence, movement of the bellcrank to control the position of the stator vanes, is provided in the form of a bracket or stop plate, indicated generally at 70. The bracket or plate, as seen in the plan view of FIGURES 5 and 6, is rectangular and includes a cam track, generally indicated at 72. The cam track may be described as somewhat Z-shaped, including an elongated intermediate portion 73 and two shorter end portions 74–75. It will be noted that the end portions form arcuate segments of approximately equal length and radius. As seen in FIGURE 7, the cam track is preferably double, being located in upper and lower platform portions 77 and 78, respectively, of bracket 72. The double platform arrangement, while not absolutely necessary, acts to prevent any tendency for the rotating latch pin 64 to bind as it moves within the track. In addition, collars 79—79 are used to fix the pin axially in the bearing 65, while permitting it to rotate about its axis. A pair of resilient gripping means, such as clips 80—80, are affixed at 81—81 to the outer surface of platform portion 77. The clips, while not a requirement, aid in maintaining the pin at either of the "stop" locations formed by the arcuate segments 74–75 of the Z-shaped cam track. Finally, the double platformed bracket 70 is itself affixed to the engine casing by permanent fastening means such as rivets 82—82, passing through a bent-over flange portion 84 of the bracket.

In operation, assume that all the engines of FIGURE 1 in the multi-engine jet propelled aircraft installation are operating normally. In such case, the stator vanes 24 will be in the normal operating position shown in FIGURE 3, whereby passages 86 are provided between adjacent vanes to permit the flow of air through the compressor. In this case, the control system stator vane actuating mechanism, in particular the pin or latching member 64 is in the position shown in FIGURE 5, that is, in the clip 80 in the arcuate segment 74 at one of the extreme ends of the intermediate portion 73 of cam track 72. The pin will be locked in this position and thus will lock the vanes in the desired position since aerodynamic loads transmitted from the vanes to the bellcrank 58, through ring 36 and clevis 63, create forces which are permitted to act through the center of the bellcrank pivot pin 62 only. That is, when the member 36, has been moved to the upper one (in the drawing) of the two extreme positions of movement along its driven path, which, of course, moves the bellcrank and latching pin 64 as shown, the axis of the projected circle of the arc of stop means 74 is co-linear with the axis of the pivot pin 62. Thus, the center of the pin and the arc indicated on the drawing are identical. This results in no turning moment about this pivot point and hence no force transmission to the actuator through the shorter arm 60. This is true regardless of whether the load force is up or down (in the drawing). The clip 80 is useful in cases where unusual vibratory loads may be expected, but in most applications the disclosed arrangement of the common bellcrank pivot point and arcuate stop means axis location will be sufficient to positively lock the pin in position.

Next, assume a sudden emergency requiring shutdown of one of the engines. The aircraft operator will immediately energize the pilot control 46 which will operate the valve means, increasing the supply of fluid to line 49, while at the same time decreasing, or venting, the fluid in line 50. The resulting differential pressure change across piston 53 causes a downward stroke of 54 which creates a clockwise moment about pivot point 62 through the shorter arm 60 of the bellcrank. This will unlatch the mechanism by carrying the pin member 64 to move to the right (in the drawing) along the arc of the segment 74 and into the intermediate portion 73 of the cam track. The pin follows the cam track along the downward stroke until it reaches the extreme left-hand portion of curved segment 75. Since the moment about point 62 is still clockwise, the pin will immediately move along the arc of the lower radius until it engages the bottom (in the drawing) spring clip 80. This stops movement of the actuator and, hence, the stator vanes, the latter being now in the closed or compressor blocking position shown in FIGURE 3, i.e., with passage 86 closed by reason of the trailing and leading edges of adjacent vanes being in abutment. Again, aerodynamic load forces applied to the actuation system through ring 36 cannot move the bellcrank either up or down, for the same reason as explained above. That is, as shown in FIG. 6, the axis of pin 62 and the axis of the projected circle of segment 75 are co-linear, the axis of arcuate segment 74 remaining, naturally, as before. Thus, in the other of the two extreme positions of movement of the driven member, i.e., at the bottom in the drawings, forces external to the system cannot unlatch or unlock the mechanism.

If it should then be desired to move the stator vanes from the blocking position in this case, or to move in another aircraft application movable members, such as, for example, the exhaust nozzle flaps shown in the patent to Schaefer—2,969,641—or the blocker-doors in the thrust reversing means disclosed in Nash—3,024,605, both of common assignment, unlatching is accomplished by energizing the actuator 51 in the opposite direction to that last mentioned. In other words, fluid pressure is supplied to line 50, as shown in FIGURE 6, as line 49 is vented, causing an upward stroke of rod 54 and a counter-clockwise moment about pivot point 62. This will unlatch the pin members 64 from the "stop" segment 75 and move the load (ring 36) towards the upper "stop" means or segment 74.

The disclosed invention therefore provides a control system having a novel, simple and highly reliable positive latching mechanism useful in locking a movable load in a machine between two extreme pre-selected operating positions, or between a pre-selected operating and non-operating position. While described in combination with a multi-engine aircraft windmill brake system, it is understood that such other uses for the control system and latching mechanism as will be within the skill of the art are intended to be within the scope of the appended claims.

1. Control mechanism comprising,
an actuator having a reciprocable output rod,
a member to be driven by said actuator,
a bell crank pivotally mounted on said member,
said output rod being pivotally connected to a first arm of said bell crank and exerting a torque force thereon in a given direction,
a relatively fixed member having a cam surface angled relative to the path of travel of said output rod,
said bell crank having a second arm with a follower engageable with said cam surface whereby movement of said output rod in one direction will be transmitted to said driven member as the bell crank pivots thereon in a given direction,
said fixed member having a socket, extending generally in the given direction of the torque force of the bell crank,
whereby said follower will be automatically displaced into said socket by said actuator, thereby latching the driven member in one extreme of movement.

2. Control mechanism as in claim 1 wherein,
the member to be driven is guided for movement in a plane parallel to the path of movement of said output rod,
the arms of said bell crank are substantially 90° apart, and
the first arm is generally normal to the path of movement of said output rod.

3. Control mechanism as in claim 2 wherein,
said socket is formed radially of the pivot center of the bell crank in said one extreme of movement, and
said first bell crank arm is substantially shorter than the second bell crank arm.

4. A drive system as in claim 1 wherein,
spring detent means are provided for releasably retaining said follower in said socket.

5. Control mechanism as in claim 2 wherein,
said fixed member has a generally Z-shaped slot receiving said follower,
said slot providing said cam surface and socket and also providing a second cam surface and second slot for transmitting motion to the driven member upon movement of the output rod in the opposite direction and latching the driven member in an opposite extreme position.

(References on following page)

References Cited

UNITED STATES PATENTS

| | | | |
|---|---|---|---|
| 809,693 | 1/1906 | Johnston | 74—107 |
| 1,243,586 | 10/1917 | Brown | 74—107 |
| 1,621,767 | 3/1927 | Capra | 74—53 |
| 1,754,216 | 4/1930 | Bouillon | 74—53 |
| 2,529,415 | 11/1950 | Phelan | 74—527 |
| 2,994,509 | 8/1961 | Walker | 253—78 |
| 3,045,500 | 7/1962 | Bruun | 74—110 |
| 3,083,892 | 4/1963 | Carey et al. | 230—114 |

FOREIGN PATENTS 900,624  12/1953  Germany.

FRED C. MATTERN, Jr., *Primary Examiner.*

W. S. RATLIFF, *Assistant Examiner.*